Nov. 18, 1930.  F. J. LYNCH  1,782,360
AUTOMATIC STOP FOR EXTRUDING MACHINES
Filed March 29, 1928   2 Sheets-Sheet 1

WITNESSES

INVENTOR
F. J. Lynch
BY
ATTORNEY

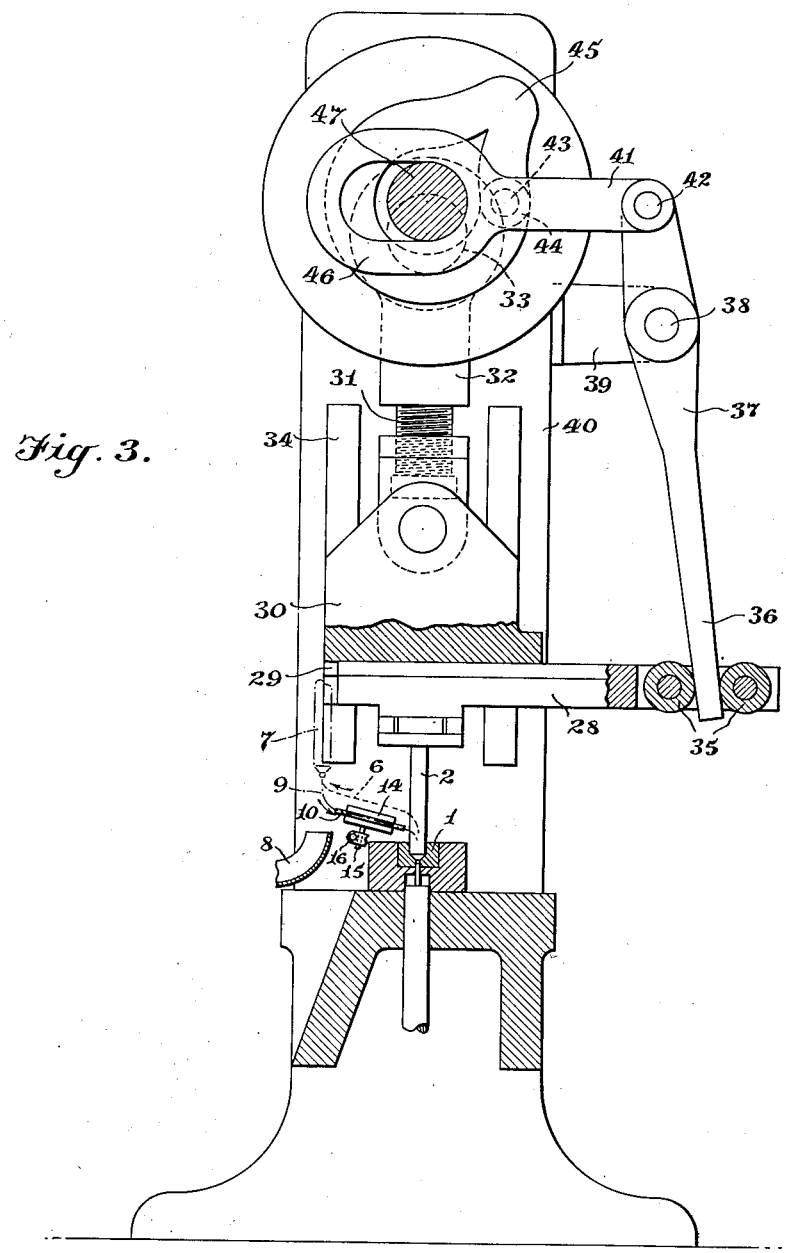

Patented Nov. 18, 1930

1,782,360

UNITED STATES PATENT OFFICE

FRANK J. LYNCH, OF HILLSIDE, NEW JERSEY, ASSIGNOR TO THE SUN TUBE CORPORATION, OF HILLSIDE, NEW JERSEY, A CORPORATION OF NEW JERSEY

AUTOMATIC STOP FOR EXTRUDING MACHINES

Application filed March 29, 1928. Serial No. 265,684.

This invention relates to an automatic stop for extruding machines and has for an object to provide an improved electric stop which will automatically and quickly stop the extruding machine when an extruded article fails to leave the extruding plunger.

Another object of the invention is to provide in an extruding machine an automatic electric stop wherein the circuit is closed by a tube or other article extruded when the same fails to leave the extruding machine at the proper time.

A still further object of the invention is to provide in connection with a tube extruding machine, a contact and circuit-closing member positioned to engage a tube when the same fails to leave the extruding machine at the proper time, while permitting a ready operation of the extruding machine when the extruded tube has left the machine at the proper time.

In the accompanying drawings—

Figure 3 is a vertical sectional view through an extruding machine disclosing an embodiment of the invention.

Figure 1:
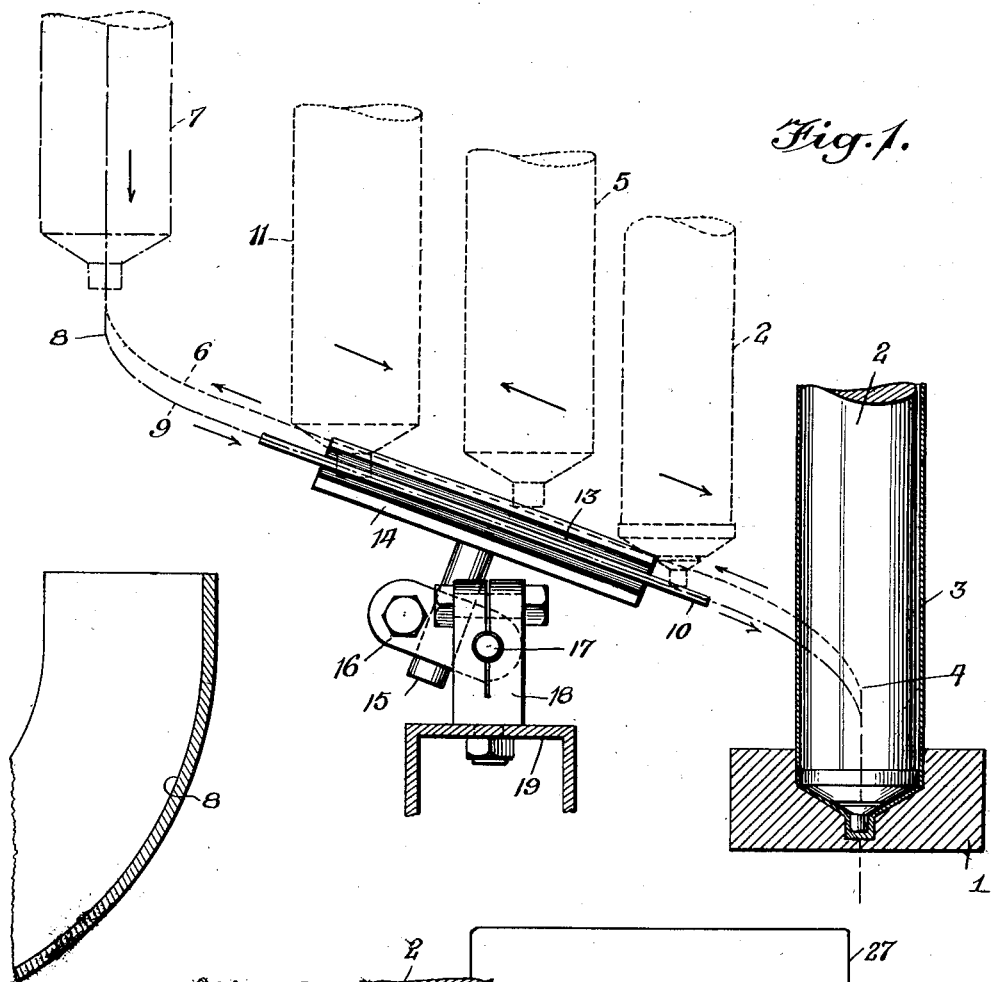
Figure 1 is a view partly in diagram and partly in section, illustrating certain features of the invention.
Figure 2:
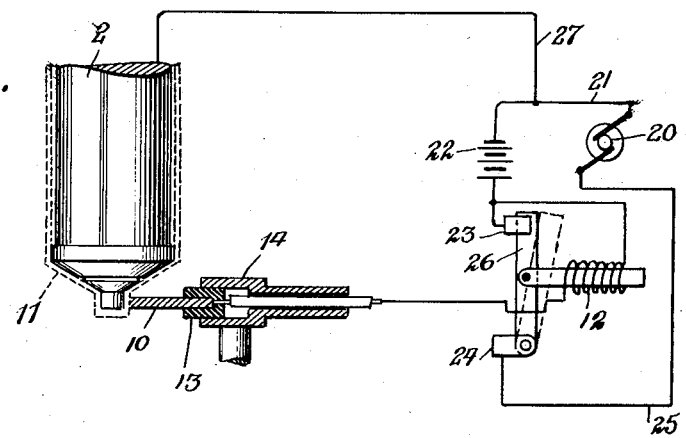
Figure 2 is a view partly in diagram and partly in section, illustrating the electric circuit and certain other parts of the automatic stop.

In extruding machines which are adapted to extrude tubes for toothpaste or other substance, a plunger is actuated in connection with the die for providing for the proper extrusion of a quantity of metal so as to form a tube. In forming the tube the plunger moves over and downwardly and finally into the die to produce the extruding action. After this has been done the plunger moves upwardly and then to one side in an inclined upwardly direction. After moving to the extreme upper position at one side of the die the extruding tube carried by the plunger is removed mechanically or by air and then the plunger returns to the die to perform the same operation a second time. This action is carried out as long as the machine is operating. The construction just described is old and well-known and therefore will need no additional description. However, in order to understand the action of the automatic stop a stationary die 1 has been shown in the drawing and a co-acting plunger 2, a slug of tin or other metal is placed in die 1 in the usual manner and then the plunger 2 moves downwardly to the position shown in Figure 1. This downward movement causes the slug to be extruded so as to form the collapsible tube 3. After this has been done the plunger 1 moves upwardly in a straight line until the lowermost point reaches the point 4. The plunger 2 with its tube 3 then moves on a slant upwardly, as indicated by the dotted line 6. The movement is continued in a direct line indicated by the dot and dash line 6 until the plunger and tube 3 reach the dotted position 7. The tube 3 is then removed by mechanical means or by air and is permitted to drop downwardly into the chute 8 which guides the tube to a desired distant point where it may be threaded, capped or otherwise finished. As soon as the air or mechanical means have functioned to remove the tube the plunger 2 moves downwardly from the position indicated at 7 until the lowermost point reaches the point 8, and then the plunger moves on a slant downwardly, as indicated by the dot and dash line 9. It will thus be seen that on the downward movement the lowermost point of the plunger is always slightly lower than when moving upwardly, so that the lowermost point of the plunger is opposite the contact or circuit-closing rail 10. This rail is spaced a sufficient distance away from the plunger, so that the plunger will not engage this rail when the plunger is free of a tube. However, when a tube is in the position indicated by the dotted structure 11, the stem of the tube will be in contact with the rail 10, and thus close the circuit of the magnetic member 12. As the plunger and tube move upwardly along the line 6 they therefore pass above the rail 10 so that there will not be a contact on the upward movement, but on the downward movement, if the tube is in place on the plunger, there will be a contact. However, if the tube has been removed as it should be, there will be no contact and the plunger will move down until it assumes again the position shown in Figure 1 for extruding a second tube. This action continues as long as the machine is in operation. Rail 10 is of metal so as to present a good conductor and is preferably supported by an insulating member 13 carried by the casing 14, which casing is supported by the stem 15 held in a given position by clamp 16. Clamp 16 is provided with a stem or shaft 17 gripped by the clamp 18 and clamp 18 in turn is supported by suitable rail 19. By this arrangement of clamps the angle of the rail 10 may be varied and also it may be raised or lowered as occasion may demand. It will, therefore, be seen that when the tube is only partly removed or not removed at all it will engage rail 10 and close the circuit of member 12. As indicated in Figure 2, the motor 20 is connected to the extruding machine for driving the plunger 2 and associated parts. This motor is connected through a wire 21 to a source of current 22. One side of the source of current 22 is connected with contact 23, while the opposite contact 24 is connected through wire 25 to the opposite pole of motor 20. When the switch 26 is closed the current will be flowing through the motor 20 for causing the same to function and operate the extruding machine in the usual manner. The solenoid 12 is connected with the switch 26 so that whenever this solenoid is energized it will pull switch 26 to an open position and thereby deprive motor 20 of current. A suitable wire or conductor 27 connects wire 21 with the plunger 22 so that whenever a tube on this plunger engages rail 10 the circuit of solenoid 12 will be closed and consequently switch 26 will be immediately opened.

The extruding machine may be of any desired type as for instance a Bliss extruding machine now in the market. In order that the actions above described may be fully understood, reference is had to Figure 3 which shows a section through a Bliss extruding machine. From this figure it will be seen that the plunger 2 is connected with the transversely moving sliding bar 28 slidingly mounted in a guide-way 29 formed in the plunger block 30. Block 30 is connected through an adjustable screw member 31 with a thrust member 32 actuated by the crank 33. This is an old and well known structure and functions to move the block 30 upwardly and downwardly on the guides 34. While this up and down movement of block 34 takes place, the bar 28 is moved inwardly and outwardly along the guide 29. To accomplish this result, bar 28 is provided with a pair of anti-friction rollers 35 between which the lower end 36 of lever 37 extends. Lever 37 is pivotally mounted at 38 on a suitable bracket 39 carried by the frame 40 of the machine. A link 41 is pivotally connected at 42 to lever 37 and this link carries a stud 43 having an anti-friction roller 44 fitting into the cam groove 45. Link 41 is provided with a bifurcated enlargement 46, said enlargement accommodating the shaft 47 which transmits the power to the working parts of the machine. By the construction just described, lever 37 is swung back and forth as block 30 is moved up and down. The structure just described is old and well known, and therefore forms no part of the present invention, except in combination. This structure, however, causes the parts to function as above described, namely to cause the plunger 2 to move downwardly for extruding a tube at the proper time and also causing the plunger 2 to move along the lines 6 and 9. It will be noted that on the up stroke of plunger 2, the plunger and the tube thereon will move along the path indicated by line 6 and the plunger will return along path indicated by the numeral 9. If the tube has been properly ejected, the machine will continue to function, but if the tube remains on the plunger it will contact with rail 10. This will cause the solenoid 12 to be inserted into the power line and consequently this solenoid will quickly open switch 26, thus depriving the driving motor 20 of current.

What I claim is:—

1. An automatic stop for extruding machines including a plunger adapted to carry a metal article and a contact rail, a switch interposed in the circuit of the motor of the extruding machine, and an electrically operated structure for opening the switch positioned in a circuit with said contact rail whereby when a metal article carried by the extruding machine contacts with said rail at any point, said switch will be opened.

2. An automatic electrical stop for extruding machines provided with a plunger adapted to carry a metal object, including a switch interposed in the circuit of the motor of the extruding machine, an electro-magnetic structure for opening said switch and a circuit for said electro-magnetic structure, including a contact rail positioned near the path of movement of the plunger of the extruding machine whereby when a metallic object carried by the plunger contacts with said rail at any point said circuit will be closed.

3. An automatic stop for tube extruding machines formed with a plunger adapted to carry a tube, including a contact rail arranged adjacent the return path of movement of the plunger of the extruding machine, and a switch-operating electro-magnetic member arranged in the same circuit as said rail whereby when said plunger carries a tube along its return path said circuit will be closed.

4. An automatic electrically-operated stop for an extruding machine driven by an electric motor, including a contact rail interposed in the circuit of said motor positioned substantially parallel to the movement of the extruding plunger of the extruding machine, means for adjustably supporting said rail, a switch interposed in the circuit of said motor and an electrically operated structure for opening the switch, whereby when a metal article carried by said plunger contacts with said rail at any point said switch may be opened.

5. An automatic electrically-operated stop for extruding machines, including a contact rail extending parallel to and adjacent the path of movement of the extruding plunger of the extruding machine, said rail being so positioned as to be out of contact with said plunger and anything carried thereby when moving in one direction, and out of contact with said plunger when moving in the opposite direction, but sufficiently near to be engaged by an article carried by the plunger when it moves in said other direction.

6. An automatic stop for extruding machine driven by a motor, including a contact rail and means for supporting said contact rail, said means being adjustable to permit the rail to be set at different angles to the horizontal and to be raised and lowered, as well as swung around a central point, a switch interposed in the circuit of said motor and an electrically operated structure for opening the switch, the circuit of said electrically operated structure being closed when a metal article carried by the extruding machine strikes said contact rail.

7. The combination with an extruding machine having a plunger moving in one path as it moves away from the extruding stroke and moving in a second path when it moves toward the extruding stroke of a contact rail arranged parallel to and adjacent said contact path whereby, if the plunger is free of a tube, it will pass said contact rail without engagement, while if it carried a tube the tube would engage the contact rail.

Signed at Hillside in the county of Union and State of New Jersey this 21st day of March A. D. 1928.

FRANK J. LYNCH.